United States Patent
Hunsberger et al.

(10) Patent No.: US 11,652,625 B2
(45) Date of Patent: May 16, 2023

(54) TOUCHLESS KEY PROVISIONING OPERATION FOR COMMUNICATION DEVICES

(71) Applicant: MOTOROLA SOLUTIONS, INC., Chicago, IL (US)

(72) Inventors: Gary P Hunsberger, Hoffman Estates, IL (US); Chris A Kruegel, Plainfield, IL (US); Kenneth C Fuchs, Winfield, IL (US); Pawel Fafara, Cracow (PL); Brian W Pruss, Streamwood, IL (US); Jakub Trojanek, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 175 days.

(21) Appl. No.: 17/303,982

(22) Filed: Jun. 11, 2021

(65) Prior Publication Data
US 2022/0400006 A1    Dec. 15, 2022

(51) Int. Cl.
*H04L 9/08*    (2006.01)
*H04W 12/0431*    (2021.01)
*H04W 12/041*    (2021.01)

(52) U.S. Cl.
CPC ............ *H04L 9/0891* (2013.01); *H04L 9/083* (2013.01); *H04L 9/0822* (2013.01);
(Continued)

(58) Field of Classification Search
CPC ............... H04W 12/04; H04W 12/041; H04W 12/043; H04L 9/080891; H04L 9/0822;
(Continued)

(56) References Cited

U.S. PATENT DOCUMENTS 8,364,964 B2 * 1/2013 Medvinsky ........... H04L 9/0833
380/279
9,143,321 B2 * 9/2015 Senese .............. H04W 12/0433
(Continued)

FOREIGN PATENT DOCUMENTS

EP    3386143 A1    10/2018

OTHER PUBLICATIONS

Gayoso Martínez, Víctor & Hernandez Encinas, Luis & Sánchez Ávila, Carmen. (2010). A Survey of the Elliptic Curve Integrated Encryption Scheme. Journal of Computer Science and Engineering. 2. 7-13.

*Primary Examiner* — Shaqueal D Wade-Wright
(74) *Attorney, Agent, or Firm* — Raguraman Kumaresan (57) ABSTRACT

A system and process for performing a touchless key provisioning operation for a communication device. In operation, a key management facility (KMF) imports a public key and a public key identifier uniquely identifying the public key of the communication device. The public key is associated with an asymmetric key pair generated at the communication device during its factory provisioning and configuration. The KMF registers the communication device and assigns a key encryption key (KEK) for the communication device. The KMF then provisions the communication device by deriving a symmetric touchless key provisioning (TKP) key based at least in part on the public key of the communication device, encrypting the KEK with the symmetric TKP key to generate a key wrapped KEK, and transmitting the key wrapped KEK to the communication device for decryption by the communication device.

18 Claims, 4 Drawing Sheets

(52) U.S. Cl.
CPC .......... *H04L 9/0825* (2013.01); *H04L 9/0866* (2013.01); *H04W 12/041* (2021.01); *H04W 12/0431* (2021.01)

(58) Field of Classification Search
CPC ..... H04L 9/0825; H04L 9/083; H04L 9/0866; H04L 9/0819; H04L 63/06; H04L 63/062
See application file for complete search history.

(56) References Cited

U.S. PATENT DOCUMENTS

| | | |
|---|---|---|
| 9,866,376 B2 | 1/2018 | Bar-El et al. |
| 10,509,911 B2 | 12/2019 | Mahaffey et al. |
| 2004/0019789 A1* | 1/2004 | Buer .................. G06F 21/57 726/28 |
| 2011/0026714 A1 | 2/2011 | Thomas et al. |
| 2015/0095648 A1 | 4/2015 | Nix |
| 2021/0005331 A1* | 1/2021 | Sawada ................ G16Y 20/10 |
| 2021/0067349 A1 | 3/2021 | Kruegel et al. |
| 2022/0209940 A1* | 6/2022 | Woo .................... H04L 9/0822 |

\* cited by examiner

TOUCHLESS KEY PROVISIONING OPERATION FOR COMMUNICATION DEVICES

BACKGROUND

Securing voice and data communications is a concern to many businesses, governments, institutions, and individuals. Securing communications between two parties typically requires a secret key to be generated and made available to the parties who wish to communicate securely over a communication channel. Parties can then use the secret key along with agreed upon encryption and decryption functions to communicate over a secure channel. Only parties having identical secret keys are then capable of intelligibly reproducing the communication. Currently, one of the most secure ways to deliver this secret key to target devices is via out-of-band delivery, for example, using a key delivery device. However, delivering keys via a key delivery device is inconvenient when there is a need to provision keys for a large number of devices at the same time as it requires physically making a contact between a key delivery device and each target device in order to securely deliver one or more secret keys to each target device. In addition, delivering keys via a key delivery device requires a number of hardware components including, but not limited to, a programming cable, a mobile adapter, and a key delivery device. Therefore, there is a need for an alternative mechanism to deliver such secret keys to target devices in a more efficient and cost effective manner.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, securing communications requires the communicating parties to encrypt their communications using a secret key provided to them. The process of loading such secret keys (also referred to as traffic encryption keys, or TEKs) into the parties' communication devices or radios is called keying or re-keying. Re-keying can be accomplished in a number of ways. In one method, TEKs can be transmitted from a centralized server, also referred to as a key management facility (KMF), to one or more target communication devices. This act of transmitting TEKs from KMF to target communication devices is called over-the-air keying (OTAK) or over-the-air rekeying (OTAR). During re-keying of a target communication device, a key encryption key (KEK) is often utilized to wrap (encrypt) the TEK when the KEK is available to the target communication device. In another method, manual rekeying can be used to deliver TEKs to the target devices by physically making a contact between a key delivery device (e.g., a key variable loader (KVL) or a key fill device (KFD)) and a target communication device. A further method provides for store and forward re-keying that involves storing key management messages along with a record of target communication devices in a key delivery device. The key management messages and associated record may be generated at the KMF and then communicated to the key delivery device. The key management messages are then delivered to the appropriate target communication devices upon connection of the key delivery device to the target communication devices. Once the target device is initialized with a KEK through a download from the key delivery device, the target device can receive a TEK from the KMF through OTAR messages.

The above key delivery mechanisms require the user to physically touch each target communication device with a key delivery device to securely deliver a KEK to the device. Alternatively, keys can be provisioned into the target devices by manually entering the keys via radio configuration software. However, this requires keys to be known and entered in a less secure configuration environment. In another method, keys can be distributed from the KMF to a radio configuration manager for delivery to the target devices. However, this method still requires a secret to be shared with a hardware security module associated with the target device. A further method allows symmetric keys to be hardcoded in the KMF and target devices to derive keys to encrypt the KEK for delivery to target devices. However, this mechanism will allow delivery of KEKs to only those devices which are already hardcoded with symmetric keys. Therefore there is a need for an efficient, convenient, and cost effective key delivery mechanism that eliminates the need to physically touch a target device with a key delivery device while still complying with the security standards for securely delivering trusted KEKs to the target device. Accordingly, an improved process of touchless key provisioning for target communication devices is disclosed below with reference to FIGS. 1-5.

One embodiment provides a method for performing a touchless key provisioning operation for a communication device. The method comprises: importing, at a key management facility (KMF), a public key and a public key identifier uniquely identifying the public key of the communication device, the public key associated with an asymmetric key pair generated at the communication device during factory provisioning and configuration of the communication device; registering, at the KMF, the communication device; assigning, at the KMF, a key encryption key (KEK) for the communication device; and provisioning, at the KMF, the communication device with the KEK by: deriving, at the KMF, a symmetric touchless key provisioning (TKP) key based at least in part on the public key of the communication device; encrypting, at the KMF, the KEK with the symmetric TKP key to generate a key wrapped KEK; and transmitting, at the KMF, the key wrapped KEK to the communication device for decryption by the communication device.

A second embodiment provides a method for performing a touchless key provisioning operation for a communication device. The method comprises: storing, at the communication device, an asymmetric key pair including a private key and a public key, the asymmetric key pair generated at the communication device during a factory provisioning and configuration of the communication device; registering the communication device with a key management facility (KMF); receiving, at the communication device, a key management message including a key wrapped key encryption key (KEK) from the KMF, wherein the key wrapped KEK is generated by encrypting a KEK assigned for the communication device with a symmetric touchless key provisioning (TKP) key and wherein the symmetric TKP key is derived based at least in part on the public key of the communication device; and decrypting the KEK from the key wrapped KEK and storing the KEK at the communication device.

A third embodiment provides a system comprising, a communication device configured to establish an asymmetric key pair including a private key and a public key for the communication device during a factory provisioning and configuration of the communication device; and a key management facility (KMF) configured to: import the public key and a public key identifier uniquely identifying the public key of the communication device; register the communication device; assign a key encryption key (KEK) for the communication device; and provision the communication device with the KEK by deriving a symmetric touchless key provisioning (TKP) key based at least in part on the public key of the communication device, encrypting the KEK with the symmetric TKP key to generate a key wrapped KEK, and transmitting the key wrapped KEK to the communication device for decryption by the communication device.

A fourth embodiment provides a method for performing a touchless key provisioning operation for a communication device. The method comprising: importing, at a key management facility (KMF), a public key and a public key identifier uniquely identifying the public key of the communication device, the public key associated with an asymmetric key pair generated at the communication device during factory provisioning and configuration of the communication device; registering, at the KMF, the communication device; assigning, at the KMF, an encryption key (KEK and/or TEK) for the communication device; and provisioning, at the KMF, the communication device with the encryption key by: encrypting the encryption key with the public key of the communication device to generate an encrypted encryption key; and transmitting the encrypted encryption key to the communication device for decryption by the communication device.

Each of the above-mentioned embodiments will be discussed in more detail below, starting with example system and device architectures of the system in which the embodiments may be practiced, followed by an illustration of processing blocks for achieving an improved technical method, device, and system for providing touchless key provisioning for communication devices. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
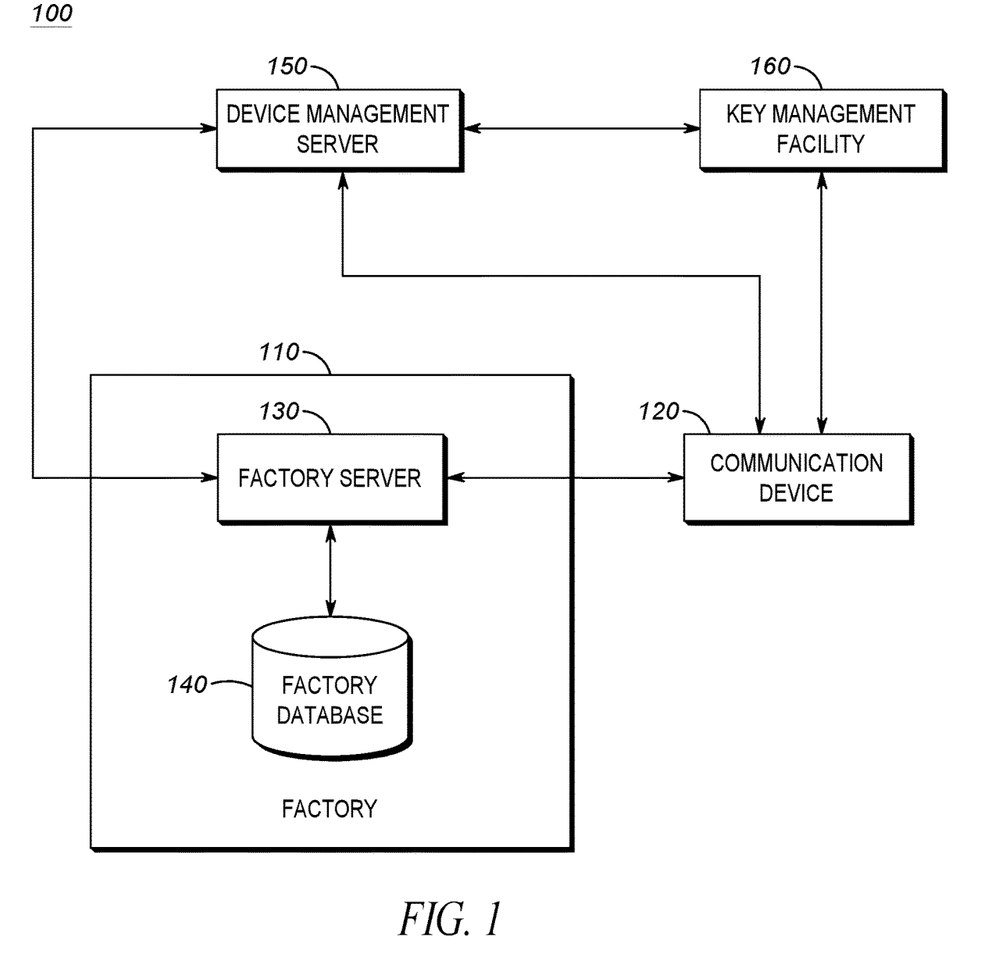
FIG. 1 is a block diagram of a system in accordance with some embodiments.

Referring now to the drawings, and in particular FIG. 1, a system 100 is shown including a factory 110 where communication devices 120 are manufactured, provisioned, and configured before being shipped to a distribution center or a customer site. Although only one communication device 120 is shown in FIG. 1 as being associated with the factory 110, the system 100 may include multiple communication devices 120 each of which can be separately manufactured, provisioned, and configured at the factory 110. As referred to herein, the communication device 120 includes, but is not limited to, devices commonly referred to as access terminals, mobile radios, mobile stations, subscriber units, user equipment (UE), mobile devices, or any other device capable of operating in a wireless environment. Examples of communication devices include, but are not limited to, two-way radios (e.g., land mobile radio or LMR), mobile phones, cellular phones, smart phones, tablets, Personal Digital Assistants (PDAs), mobile data terminals (MDT), laptops and two-way pagers. In one embodiment, the communication device 120 may include fixed communication equipment. The communication device 120 may be a device maintained, for example, at a call center or public safety command center (e.g., a desktop computer). The communication device 120 may communicate in accordance with any standard or proprietary wireless communication protocol that allows for communication of voice and/or data, including, but not limited to, Terrestrial Trunked Radio (TETRA), Association of Public Safety Communications Officials International (APCO) Project 25, Institute of Electrical and Electronics Engineers (IEEE) 802.11, IEEE 802.16, Long Term Evolution (LTE), Universal Mobile Telecommunication System (UMTS), Evolved-Data Optimized (EVDO), or other communication network technologies.

In accordance with embodiments, the factory 110 is a manufacturer-controlled facility or environment where at least one asymmetric key pair is established for the communication device 120 during a factory provisioning and configuration of the communication device 120. A factory server 130 may provision and configure (e.g., by loading firmware, codeplug, region-specific regulatory restrictions etc.), the communication device 120 (e.g., in accordance with customer requirements specified on a customer order) when the communication device 120 is manufactured at the factory 110. In accordance with some embodiments, during provisioning and configuration of the communication device 120, the factory server 130 further sends a key pair creation request to a baseband processor of the communication device 120 to generate an asymmetric key pair at the communication device 120. In response, the communication device 120 generates an asymmetric key pair comprising a public key and a private key. In accordance with embodiments, the asymmetric key pair is generated and stored at the communication device 120 prior to the communication device 120 being shipped from the factory 110 to a distribution center or a customer site. In other words, the asymmetric key pair is generated and stored at the communication device 120 before it is activated for customer use (e.g., for communication in a region of operation desired by a customer). The asymmetric key pair may be securely stored in a hardware security module (HSM) included in the communication device 120 and further protected against unauthorized erasure. In one embodiment, the communication device 120 is configured to permanently store the generated asymmetric key pair along with a device identifier (e.g., serial number) that uniquely identifies the communication device 120. In accordance with some embodiments, the factory server 130 extracts a public key of the asymmetric key pair established at the communication device 120 for storage in a factory database 140. A public key identifier may be assigned to the public key to uniquely identify a public key of the communication device 120 at the factory database 140. In accordance with some embodiments, for security purposes, the public key along with the public key identifier is extracted from the communication device 120 and further stored at the factory database 140 before the communication device 120 is shipped out of the factory 110.

In accordance with some embodiments, in order for the communication device 120 to operate with different security modes or security levels (e.g., federal information processing standard (FIPS) 140-2 security levels), the factory server 130 may request the communication device 120 to generate multiple asymmetric key pairs. Each asymmetric key pair respectively includes a public key and a private key. As an example, a communication device 120 may generate and store up to four different asymmetric key pairs, where each of the four different asymmetric key pairs is used for operating the communication device 120 with a security level selected from four different security levels. In this example, the respective public keys of the four different asymmetric key pairs are each assigned a different public key identifier. The public keys along with the assigned public key identifiers associated with the communication device 120 are then stored at the factory database 140. Since the factory database 140 may store public keys and public keys identifiers for multiple communication devices 120 manufactured at the factory 110, the factory database 140 may link a group of asymmetric key pairs and public key identifiers associated with each respective communication device 120 to a unique identifier (e.g., device identifier) identifying the respective communication device 120. The factory database 140 may further store information mapping each public key and/or public key identifier to a particular security level. In one embodiment, a portion of the public key identifier may be used for indicating a security level to which a public key identified by the public key identifier is mapped.

The factory server 130 transmits information regarding the communication devices 120 that are manufactured at the factory 110 to a device management server 150. In accordance with some embodiments, the transmission of information regarding the communication devices 120 to the device management server 150 occurs in response to receiving a customer order for the communication devices 120. The information transmitted to the device management server 150 may include one or more unique identifiers, one or more public keys generated during factory provisioning and configuration of the communication device 120, one or more public key identifiers respectively assigned to identify each of the one or more public keys, mapping information identifying a security level mapped to each public key and/or public key identifier, and customer order number. The one or more unique identifiers may include a serial number of the communication device 120, an international mobile equipment identity (IMEI), and/or the like. A unique identifier may also be used to identify a specific part/component of the communication device 120. In some embodiments, the unique identifier is a part number of a component of the communication device 120. For example, the unique identifier may be an integrated circuit card identity (for example, a serial number or integrated circuit card identification number (ICCID) of a subscriber identity module (SIM)).

The device management server 150 may be operated and maintained by a manufacturer or a customer of the communication device 120 and may be configured to store configuration information for different types of communication devices 120. In accordance with some embodiments, the device management server 150 provides configuration settings or codeplug to the communication device 120 in response to receiving an indication that the communication device 120 has been powered-up for the first time after being shipped out of the factory 110, for example, to a customer site. In some embodiments, the device management server 150 may modify or provide new configuration settings or new codeplug to the communication device 120 in response to powering the communication device 120 or in response to a user request for changing a mode of operation (e.g., to switch from one channel to another channel or to switch from one communication system to another communication system) of the communication device 120. For example, a customer may specify configuration settings (e.g., network settings, contacts, time zones, audio profile settings, button functionality settings, region of operation, encryption option, and the like) for the communication device 120 while ordering the communication device 120. The customer-specified configuration settings captured during the ordering process are mapped to a unique identifier of a communication device 120 manufactured at the factory 110. The configuration settings and the unique identifier are then transmitted to the device management server 150, for example, from the factory server 130, to enable the device management server 150 to identify a communication device 120 using the unique identifier and further configure the communication device 120 with the customer-specified configuration settings that are mapped to the unique identifier of the communication device 120.

In accordance with some embodiments, a device management client or console (not shown) connected to the device management server 150 allows an administrator or customer to login into a customer instance of the device management server 150 to configure a codeplug representing the operational capabilities of a communication device 120. The administrator may further enable or disable the touchless key provisioning operation for each communication device via the device management server 150. If the touchless key provisioning operation is disabled for the communication device 120, then the communication device 120 refrains from executing the touchless key provisioning operation (e.g., process 500 shown in FIG. 5) 120. In this case, alternative methods such as the use of a key delivery device or key variable loader may be required to provision keys at the communication device 120. On the other hand, if the touchless key provisioning operation is enabled for the communication device 120, the communication device 120 executes the touchless key provisioning operation to securely receive the key encryption key or KEK from the KMF 160. This eliminates the need for the communication device 120 to make physical contact with any key delivery device to receive the key encryption key. In some embodiments, the administrator may enable or disable the touchless key provisioning operation separately for each security level with which the communication device 120 may be operated. As an example, the administrator may enable the touchless key provisioning operation for the communication device 120 to operate with the FIPS 140-2 level 2 security level, but not for the FIPS 140-2 level 3 security level. In this example, the communication device 120 executes the touchless key provisioning operation to securely receive the key encryption key from the KMF 160 in order to operate the communication device 120 with the FIPS 140-2 level 2 security level but not the FIPS 140-2 level 3 security level. Further, in accordance with some embodiments, when the touchless key provisioning operation is completed with respect to a particular security level, the touchless key provisioning operation may be automatically or manually disabled for that security level for future provisioning in order to prevent the communication device 120 from procuring additional key encryption keys for that security level. However, the administrator may manually override this setting (i.e., when the touchless key provisioning operation is disabled at the device management server 150 for the communication device 120) to allow the communication device 120 to perform subsequent touchless key provisioning operations with respect to the same security level.

The device management server 150 may also allow the administrator to provision, for each communication device 120, information identifying a particular key management facility (e.g., KMF 160) to be used by the communication device 120 for performing the touchless key provisioning operation. In this case, the administrator may enter a radio set identifier (RSI) at the device management server 150 to associate the communication device 120 with a particular KMF 160 to be used for completing the touchless key provisioning operation for the communication device 120. In addition to configuring the communication device 120, the device management server 150 also receives the public key(s) and public key identifier(s) of the communication device 120 from the factory database 140 and further stores the public key(s) along with public key identifier(s) identifying the public key(s). In this case, the KMF 160 also allows the administrator to select a list of communication devices 120 for which public keys generated at the respective communication devices 120 are to be imported at KMF 160 for completing the touchless key provisioning operation at the respective communication device 120. The device management server 150 may generate a public key file including the public key and public key identifier(s) of the communication device 120. The device management server 150 may also allow the administrator to enter a passphrase to lock the public key file prior to exporting the public key(s) to KMF 160 for added security.

The key management facility or KMF 160 is an infrastructure endpoint computer that is configured to store and manage encryption keys for performing the over-the-air re-keying (OTAR) operation for communication device 120. In accordance with embodiments, the KMF 160 imports a public key and a public key identifier identifying the public key generated at the communication device 120 during the factory provisioning and configuration of the communication device 120. In one embodiment, the import operation may be initiated by an operator of the KMF 160 by logging into the KMF 160 via a KMF client (not shown) and inputting a passphrase (i.e., same passphrase previously entered at the device management server 150 to lock the public key file) for unlocking/importing the public key file. When the passphrase matches, the public key file is successfully imported to the KMF 160. The operator may need to enter a radio set identifier (RSI) (i.e., same RSI value previously entered at the device management server 150) at the KMF 160 to associate the communication device 120 with the KMF 160 prior to initiating the touchless key provisioning operation between the KMF 160 and the communication device 120.

In accordance with embodiments, the KMF 160 further assigns, for example, in response to an input from the operator, a key encryption key (KEK) for the communication device 120. The KMF 160 further allows an operator of the KMF 160 to enable or disable the touchless key provisioning operation at the KMF 160 for the communication device 120. If the touchless key provisioning operation is disabled for the communication device 120, then the KMF 160 refrains from executing the touchless key provisioning operation (e.g., process 500 shown in FIG. 5) 120. In this case, alternative methods such as the use of a key delivery device or key variable loader may be required to provision keys at the communication device 120. On the other hand, if the touchless key provisioning operation is enabled for the communication device 120, the KMF 160 may execute the touchless key provisioning operation to securely transfer the key encryption key to the communication device 120. In some embodiments, the KMF operator may enable or disable the touchless key provisioning operation separately for each security level with which the communication device 120 may be operated. As an example, the operator may enable the touchless key provisioning operation at the KMF 160 for the communication device 120 to operate with the FIPS 140-2 level 2 security level, but not for the FIPS 140-2 level 3 security level. In this example, the KMF 160 executes the touchless key provisioning operation to securely transfer the key encryption key to the communication device 120 to enable the communication device 120 to operate with the FIPS 140-2 level 2 security level but not the FIPS 140-2 level 3 security level. Further, in accordance with embodiments, when the touchless key provisioning operation is completed with respect to a particular security level, subsequent touchless key provisioning operations may be automatically or manually disabled at the KMF 160 for that security level in order to prevent the KMF 160 from provisioning additional key encryption keys for that security level. However, the KMF operator may manually override this setting (i.e., when the touchless key provisioning operation is disabled at the KMF 160 for a particular security level of the communication device) to allow the KMF 160 to perform subsequent touchless key provisioning operations with respect to the same security level. In one embodiment, the KMF operator may be allowed to disable performing the touchless key provisioning operation for the communication device 120 with respect to all security levels. In this case, once the touchless key provisioning operation is disabled for the communication device 120, the KMF 160 refrains to perform the touchless key provisioning operation for the communication device 120 with respect to any of the security levels.

In accordance with embodiments, when the communication device 120 is powered-up for operation for the first time for customer use or after a configuration change, the communication device 120 securely connects to the device management server 150 and downloads configuration settings or codeplug including a profile of an associated KMF 160 from the device management server 150. The communication device 120 applies the downloaded configuration settings or codeplug and switches to a talk group or channel to register with the associated KMF 160 based on the profile. After registering the communication device 120 with the KMF 160, the communication device 120 and KMF 160 execute a touchless key provisioning operation (see FIG. 5) resulting in the secure transfer of one or more key encryption keys from the KMF 160 to the communication device 120. The communication device 120 then stores the one or more key encryption keys and executes further OTAR procedure with the KMF 160 to obtain one or more traffic encryption keys (TEKs) using the KEKs. The communication device 120 then may use the obtained TEKs for encrypting voice or data transmissions.

While FIG. 1 illustrates one example embodiment of the system 100, in other embodiments, the system 100 may include more or fewer components and may perform functions that are not explicitly described herein. For example, the system 100 may include additional communication devices, device management servers, key management facilities and factories. Further, in some embodiments, one or more entities of the system 100 are combined into a single device. For example, the device management server 150 and key management facility 160 may be combined into a single infrastructure that performs the functions of both entities that are described herein.

Figure 2:
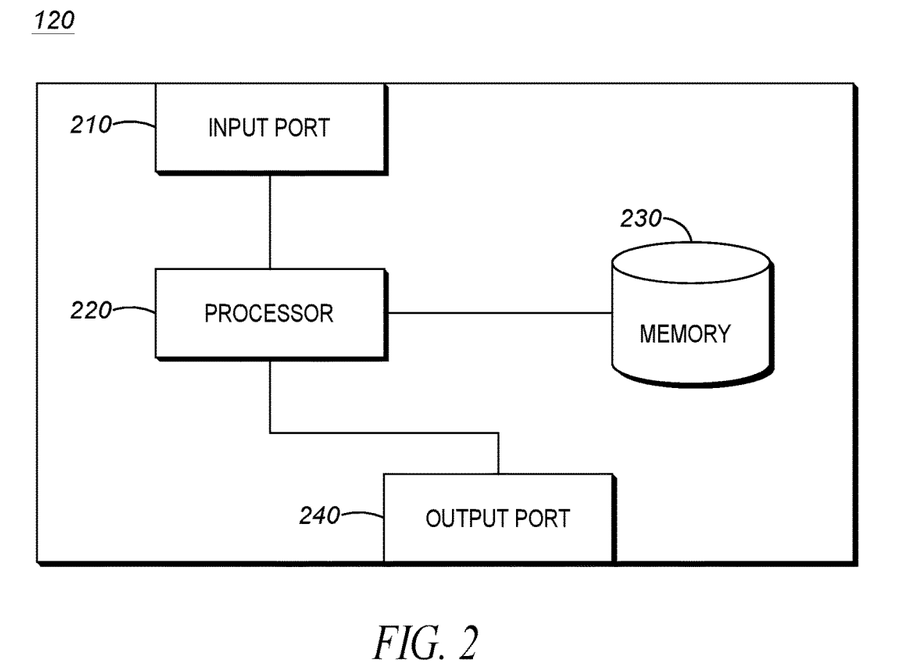
FIG. 2 is a block diagram of a communication device shown in FIG. 1 in accordance with some embodiments.

FIG. 2 is an example functional block diagram of a communication device 120 in accordance with some embodiments. In the embodiment shown in FIG. 2, the communication device 120 includes an input port 210, a processor 220, a memory 230, and an output port 240. Depending on the type of communication device 120, the communication device 120 may include fewer or additional components in configurations different from that illustrated in FIG. 2. The input port 210 and processor 220 communicate over one or more communication lines or buses. Similarly, the processor 220 and output port 240 communicate over one or more communication lines or buses. Wireless connections or a combination of wired and wireless connections are also possible. The input port 210 receives electronic signals from the factory server 130, device management server 150, and KMF 160. The input port 210 is electrically connected to the processor 220. The output port 240 transmits signals to the factory server 130, the device management server 150, and the KMF 160. The output port 240 is electrically coupled to the processor 220. Although depicted in FIG. 2 as two separate elements, input port 210 and output port 240 can be a single element, such as a transceiver that could be an LTE modem, an FM transceiver, or a Wi-Fi or Ethernet transceiver.

The processor 220 may include one or more of a microprocessor, application-specific integrated circuit (ASIC), field-programmable gate array, or another suitable electronic device. In accordance with some embodiments, the processor 220 includes a baseband processor and an application processor. The processor 220 obtains and provides information (for example, from memory 230 and/or input port 210), and processes the information by executing one or more software instructions or modules, capable of being stored, for example, in a random access memory ("RAM") area of memory 230 or a read only memory ("ROM") of memory 230 or another non-transitory computer readable medium (not shown). The software can include firmware, one or more applications, program data, filters, rules, one or more program modules, and other executable instructions. The processor 220 is configured to retrieve from memory 230 and execute, among other things, software related to the control processes and methods described herein.

The memory 230 can include one or more non-transitory computer-readable media, and may include a program storage area and a data storage area. The program storage area and the data storage area can include combinations of different types of memory, as described herein. In the embodiment illustrated, the memory 230 stores, among other things, instructions for processor 220 to carry out any methods included herein. In accordance with embodiments, the memory 230 stores the asymmetric key pair (or multiple asymmetric key pairs) including a private key and public key generated at the communication device 120 during a factory provisioning and configuration of the communication device 120. The asymmetric key pair is securely stored at the memory 230 and the private key of the asymmetric key pair is never exposed outside the communication device 120. In some embodiments, the asymmetric key pair is protected against erasure and further remains intact for the lifetime of the communication device 120. For example, in these embodiments, the asymmetric key pair may be securely stored in a second processor (not shown) associated with an HSM, which may be, for example, a FIPS 140-2 level 2 or level 3 security module included in the communication device 120.

Depending on the type of communication device 120 specified in a customer order, the memory 230 may be programmed by the factory server 130 to include different software/firmware options that are executable by the processor 220. For example, software/firmware options may be loaded onto the memory 230 during factory provisioning and configuration of the communication device 120 at the factory 110. The software/firmware options may also include programming instructions to communicate with a device management server 150 and to download configuration settings or codeplug (e.g., to activate the communication device 120 for customer use) from the device management server 150, for example, when the communication device 120 is powered-up for operation after being shipped out of the factory 110 to a customer site.

Figure 3:
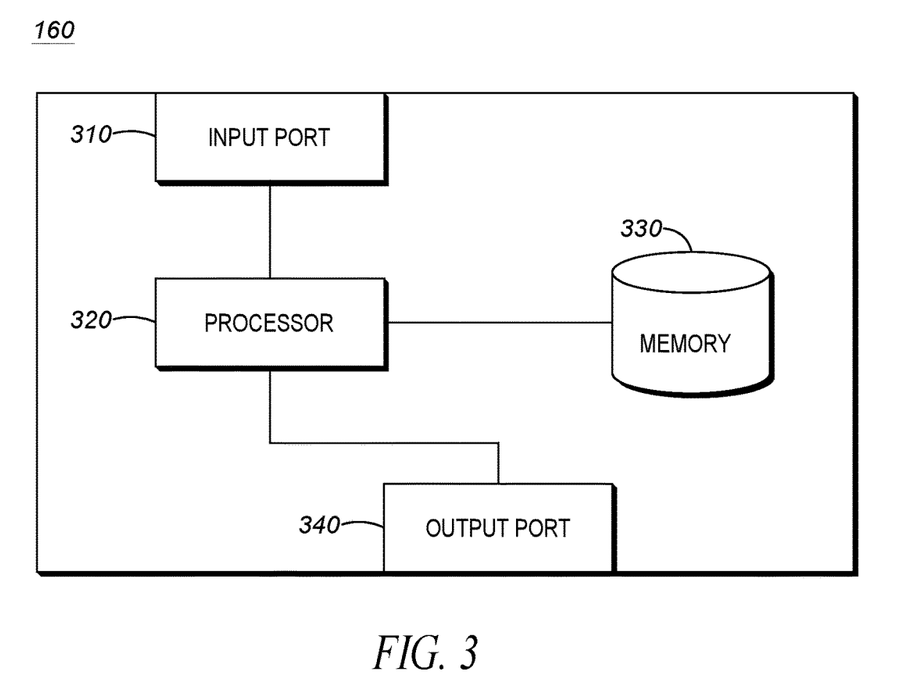
FIG. 3 is a block diagram of a key management facility shown in FIG. 1 in accordance with some embodiments.

FIG. 3 schematically illustrates a key management facility (KMF) 160 in more detail. In the embodiment depicted in FIG. 3, the KMF 160 includes an input port 310, a processor 320, a memory 330, and an output port 340. The input port 310 and processor 320 communicate over one or more communication lines or buses. Similarly, the processor 320 and output port 340 communicate over one or more communication lines or buses. Wireless connections or a combination of wired and wireless connections are also possible.

The input port 310 may receive electronic signals from one or more of the device management server 150 and communication device 120. The input port 310 is electrically connected to the processor 320. Output port 340 may transmit signals to one or more of the device management server 150 and the communication device 120. Output port 340 is electrically coupled to processor 320. Although depicted in FIG. 3 as two separate elements, input port 310 and output port 340 can be a single element, such as a transceiver that could be an LTE modem, an FM transceiver, or a Wi-Fi or Ethernet transceiver.

The processor 320 may include a microprocessor, application-specific integrated circuit (ASIC), field-programmable gate array, or another suitable electronic device. The processor 320 obtains and provides information (for example, from memory 330 and/or input port 310), and processes the information by executing one or more software instructions or modules, capable of being stored, for example, in a random access memory ("RAM") area of memory 330 or a read only memory ("ROM") of memory 330 or another non-transitory computer readable medium (not shown). The software can include firmware, one or more applications, program data, filters, rules, one or more program modules, and other executable instructions. The processor 320 is configured to retrieve from memory 330 and execute, among other things, software related to the control processes and methods described herein.

The memory 330 can include one or more non-transitory computer-readable media, and may include a program storage area and a data storage area. The program storage area and the data storage area can include combinations of different types of memory, as described herein. In the embodiment illustrated, memory 330 stores, among other things, instructions for processor 320 to carry out the any methods included herein. In accordance with embodiments, the memory 330 of the KMF 160 further stores public keys and public key identifiers of communication devices 120 imported via the device management server 150. In addition, the memory 330 may also store KEKs assigned to different communication devices 120 that are associated with the KMF 160. In an alternative embodiment, the KEKs may be securely stored at the KMF 160 in a second processor (not shown) associated with an HSM. In these embodiments, the KEKs may be encrypted prior to their storage.

Although different embodiments described herein suggest that the touchless key provisioning operation is performed between the KMF 160 and a target communication device 120, in alternative embodiments, a device (not shown) external to the KMF 160 may perform one or more functions (e.g., described with reference to process 500 shown in FIG. 5) associated with the touchless key provisioning operation. In these alternative embodiments, the device performing the touchless key provisioning operation on behalf of the KMF 160 may correspond to a FIPS 140-2 level 2 validated device.

Figure 4:
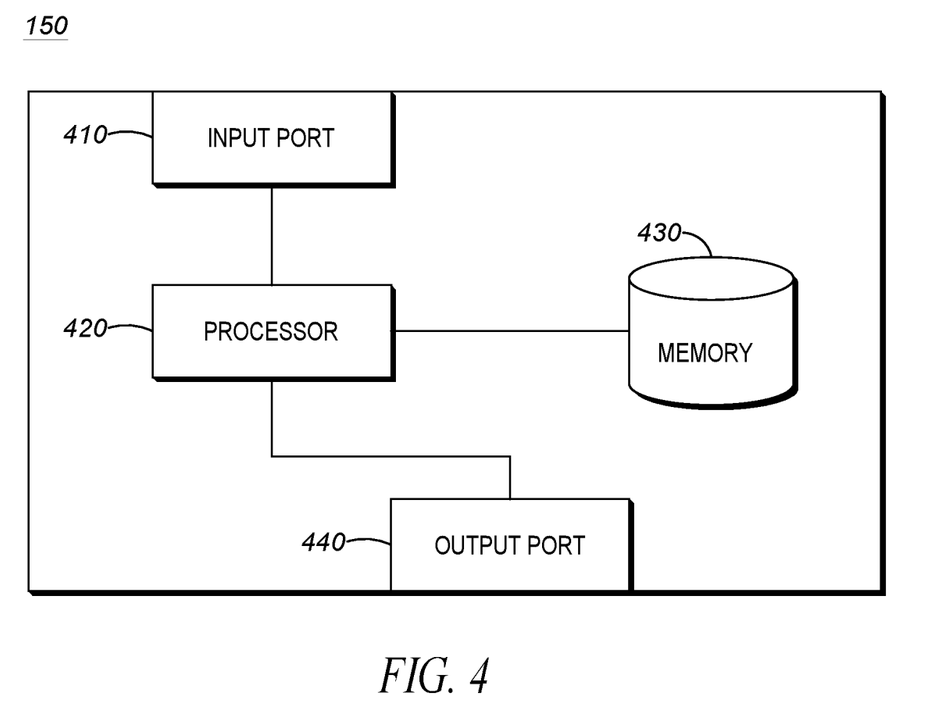
FIG. 4 is a block diagram of a device management server shown in FIG. 1 in accordance with some embodiments.

FIG. 4 schematically illustrates a device management server 150 in more detail. In the embodiment depicted in FIG. 4, the device management server 150 includes an input port 410, a processor 420, a memory 430, and an output port 440. The input port 410 and processor 420 communicate over one or more communication lines or buses. Similarly, the processor 420 and output port 440 communicate over one or more communication lines or buses. Wireless connections or a combination of wired and wireless connections are also possible.

The input port 410 may receive electronic signals from one or more of the communication device 120, factory server 130, and KMF 160. The input port 410 is electrically connected to the processor 420. Output port 440 may transmit signals to one or more of the communication device 120, factory server 130, and KMF 160. The output port 440 is electrically coupled to processor 420. Although depicted in FIG. 4 as two separate elements, input port 410 and output port 440 can be a single element, such as a transceiver that could be an LTE modem, an FM transceiver, or a Wi-Fi or Ethernet transceiver.

The processor 420 may include a microprocessor, application-specific integrated circuit (ASIC), field-programmable gate array, or another suitable electronic device. The processor 420 obtains and provides information (for example, from memory 430 and/or input port 410), and processes the information by executing one or more software instructions or modules, capable of being stored, for example, in a random access memory ("RAM") area of memory 430 or a read only memory ("ROM") of memory 430 or another non-transitory computer readable medium (not shown). The software can include firmware, one or more applications, program data, filters, rules, one or more program modules, and other executable instructions. The processor 420 is configured to retrieve from memory 430 and execute, among other things, software related to the control processes and methods described herein.

The memory 430 can include one or more non-transitory computer-readable media, and may include a program storage area and a data storage area. The program storage area and the data storage area can include combinations of different types of memory, as described herein. In the embodiment illustrated, memory 430 stores, among other things, instructions for processor 420 to carry out the any methods included herein. In accordance with embodiments, the memory 430 stores information regarding one or more communication devices 120 that are manufactured at the factory 110. For example, the memory 430 stores information including one or more unique identifiers, one or more public keys and public key identifiers generated for the communication devices 120 during factory provisioning and configuration of the communication devices 120. The memory 430 further stores configuration settings or codeplug to be configured at the communication device 120 when the communication device 120 is powered-up for operation after being shipped out of the factory 110 to a customer site or when the communication device 120 is to be operated in new mode.

Figure 5:
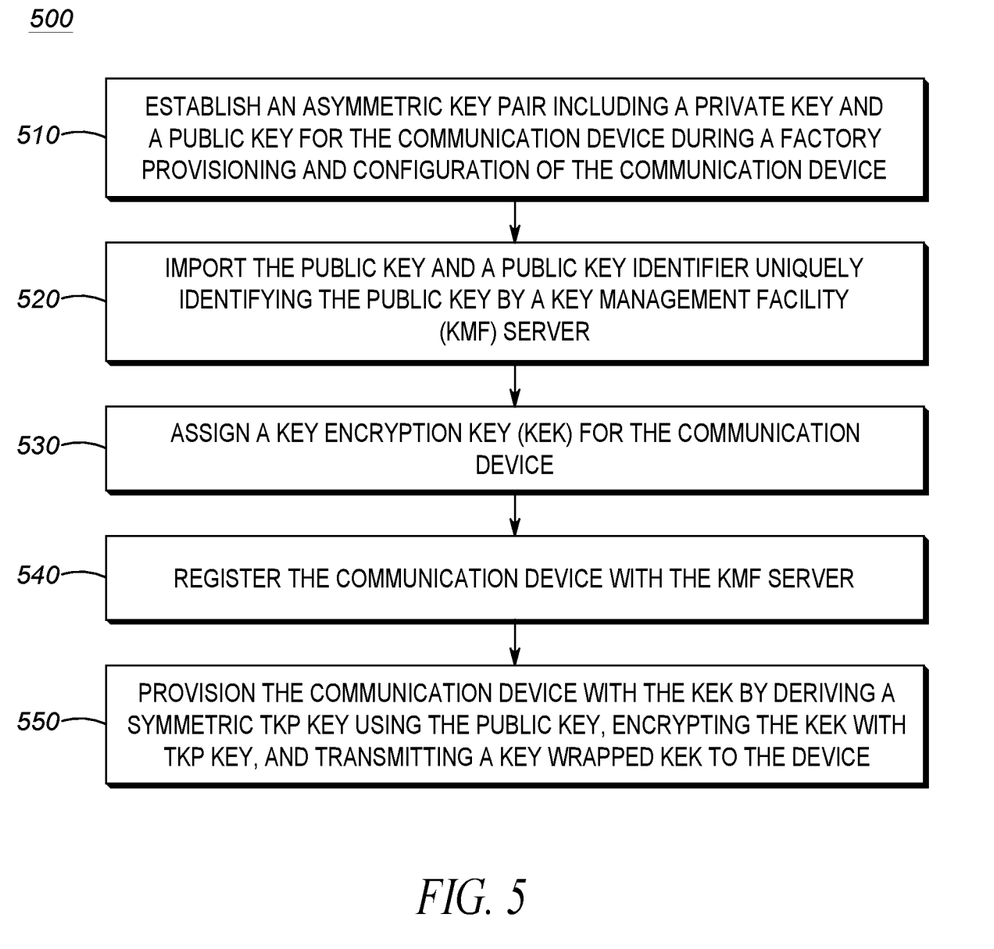
FIG. 5 illustrates a flow diagram of a process for performing a touchless key provisioning operation for a communication device in accordance with some embodiments.

Turning now to FIG. 5, a flowchart diagram illustrates a process 500 for performing touchless key provisioning for a communication device. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. One or more of the communication device 120, factory server 130, device management server 150, and KMF 160 shown in FIGS. 1-4, and embodied as a singular computing device or distributed computing device may execute process 500.

The process 500 of FIG. 5 need not be performed in the exact sequence as shown and likewise various blocks may be performed in different order or alternatively in parallel rather than in sequence. The process 500 may be implemented on variations of the system 100 of FIG. 1 as well.

At block 510, an asymmetric key pair including a private key and a public key is established for the communication device 120 during a factory provisioning and configuration of the communication device 120. In accordance with some embodiments, the asymmetric key pair is generated at the communication device 120 under a manufacturer-controlled environment i.e., prior to the communication device 120 being shipped out of the factory 110 to a distribution center or a customer site. In these embodiments, the factory server 130 (e.g., a factory test station at the factory 110) sends a request to the communication device 120 (among other communication devices) manufactured at the factory to establish an asymmetric key pair for the communication device 120. In response, the communication device 120 generates an asymmetric key pair including a private key and a public key and further securely stores the asymmetric key pair within the communication device 120. In some embodiments, the communication device 120 may generate multiple asymmetric key pairs. In these embodiments, each asymmetric key pair respectively includes a public key and a private key. Further, each asymmetric key pair may be mapped to a different security level of operating the communication device 120. The communication device 120 and/or the factory server 130 may assign a public key identifier to uniquely identify the respective public keys generated at the communication device 120.

At block 520, the public key and the public key identifier uniquely identifying the public key is imported by the KMF 160. In accordance with some embodiments, the factory server 130 extracts the public key and public key identifier identifying the public key from the communication device 120 for storage at the factory database 140. The factory database 140 may store multiple such public keys and public key identifiers for the communication device 120, where each public key and/or public key identifier is mapped to one of a plurality of security levels with which the communication device 120 may be operated after being provisioned with the key encryption key. Further, the factory database 140 may store public keys and public key identifiers for multiple such communication devices 120 manufactured at the factory 110. The factory server 130 then transmits the public key and public key identifier of the communication device 120 to the device management server 150. For example, transmission of the public key and public key identifier of the communication device 120 from the factory server 130 to the device management server 150 may occur in response to receiving a customer order. In one embodiment, the factory server 130 receives a customer order from an ordering system (not shown), assigns a communication device 120 meeting the specifications of the customer order by tagging a device identifier such as a serial number of the communication device 120 assigned to the customer order. The factory server 130 then extracts the public key and public key identifier from the factory database 140. The factory server 130 then forwards the device identifier tagged to the customer order along with the public key and public key identifier to the device management server 150.

The KMF 160 then imports the public key and public key identifier of the communication device 120 via the device management server 150. The mapping information mapping the public key identifier/public key to a particular security level or mode may be included within a portion of the public key identifier. In accordance with some embodiments, the KMF 160 imports the public key and public key identifier for only those communication devices associated with the KMF 160 for the touchless key provisioning operation. An administrator may configure a profile of the KMF 160 to be associated with a particular communication device 120 by logging into the device management server 150 and/or KMF 160.

At block 530, one or more encryption keys, for example, one or more key encryption keys (KEKs) for the communication device 120 is assigned. In accordance with embodiments, the KMF may assign a KEK (e.g., a unique key encryption key or UKEK) for each communication device 120 associated with the KMF. In accordance with some embodiments, the KMF 160 may assign a KEK for the communication device 120 after successfully registering (i.e., after block 540) the communication device 120.

In one alternative embodiment, one or more encryption keys, for example, one or more traffic encryption keys (TEKs) may be assigned by the KMF 160 in addition to or alternative to KEKs at block 530.

At block 540, the communication device 120 is registered with the KMF 160. In accordance with some embodiments, when the communication device 120 is powered-up for operation, for example, the first time after being shipped out of the factory 110 to a customer site or when the communication device 120 switches to a new mode of operation (e.g., after a configuration change), the communication device 120 registers with the KMF 160. The communication device 120 may switch to a new mode of operation to connect with a new KMF personality (e.g., when the communication device roams to a geographic area associated with a new KMF) or to reconnect with the existing KMF 160 in order to operate with a different security level. In accordance with embodiments, the communication device 120 sends a registration request to an associated KMF 160. In one embodiment, when the KMF 160 receives a registration request from the communication device 120, the KMF 160 compares an identifier such as a radio set identifier included in the registration request with a radio set identifier configured at the KMF 160 to determine whether the communication device 120 is authorized to be registered at the KMF 160. In this embodiment, when the received identifier matches with the identifier configured at the KMF 160, the KMF 160 sends a registration response indicating that the communication device 120 is successfully registered for performing the touchless key provisioning operation. In another embodiment, the communication device 120 may be configured to not request a registration response. In this embodiment, the KMF 160 may not send a registration response to the communication device 120, but the registration request received from the communication device 120 may trigger the KMF 160 to initiate the touchless key provisioning operation for the communication device 120.

In accordance with some embodiments, after registering the communication device 120 but prior to provisioning the KEK at the communication device 120, the KMF 160 transmits a key management message to the communication device 120 to request the communication device 120 to provide a public key identifier uniquely identifying a public key stored at the communication device 120. When the communication device 120 receives the key management message from the KMF 160, the communication device 120 transmits a response including a public key identifier identifying a public key stored at the communication device 120. Since the communication device 120 may be associated with multiple asymmetric key pairs, the response from the communication device 120 includes a public key identifier as well as mapping information mapping the public key identifier to a particular security level with which the communication device 120 will be operated. In one embodiment, the mapping information may be included within a portion of the public key identifier. The particular security level included in the mapping information may be selected from a plurality of security levels. In these embodiments, the communication device 120 may operate either in FIPS (federal information processing standard) mode or non-FIPS mode. In FIPS mode, the communication device 120 may operate in one of FIPS 140-2 level 2 or FIPS 140-2 level 3 security levels. As an example, in FIPS mode, the KEKs assigned to the communication device 120 may include advanced encryption standard (AES-256) keys. In non-FIPS mode, the communication device 120 may operate in level 0 security level or level 1 security level, where the level 1 security level has a higher security bar than the level 0 security level. As an example, the KEKs assigned to the communication device 120 for operating in non-FIPS mode may include AES, DES-OFB, DES-XL, or DVP-XL keys.

In accordance with some embodiments, the communication device 120 is configured to operate in one of four security levels (e.g., non-FIPS level 0 security level, non-FIPS level 1 security level, FIPS 140-2 level 2 security level, FIPS 140-2 level 3 security level). In these embodiments, at block 510, the communication device 120 generates four asymmetric key pairs each including separate public and private keys, and further each asymmetric key pair is mapped to one of the four security levels. Accordingly, in these embodiments, the KMF 160 may assign four KEKs each compliant with an encryption scheme specified by a respective security level. For example, when the communication device 120 is to be operated with FIPS 140-2 level 2 security level, the KMF 160 may assign a KEK that is compliant with an encryption scheme (e.g., AES-256) specified by the FIPS 140-2 level 2 security level. Further, in this embodiment, based on the response received from the communication device 120, the KMF 160 stores information mapping each public key identifier (identifying one of the four public keys imported by the KMF 160) to one of the four security levels. In one embodiment, the mapping information identifying the security level may be indicated as part of the public key identifier identifying the public key. The KMF 160 uses the mapping information included in the response received from the communication device 120 to accurately select a particular public key for provisioning the communication device 120 at block 550. In some embodiments, the KMF 160 may further use the mapping information to determine whether the public key mapped to the security level was already used to provision the communication device 120 with one or more KEKs for the same security level. If the public key was previously used for provisioning the communication device 120 for the same security level, then the KMF 160 refrains from delivering additional KEKs for the same security level. In this case, the KMF 160 does not execute the functions described herein with reference to block 550 for performing the touchless key provisioning operation for the communication device 120 for that security level. In these embodiments, an extra level of security is added by not delivering additional KEKs (mapped to the same security level) to the communication device 120. Optionally, the KMF 160 may alert an operator of the KMF 160 or a user of the communication device 120 regarding the communication device's 120 attempt to procure additional keys for the same security level.

In accordance with some embodiments, after registering the communication device 120 at block 540, but prior to provisioning the communication device 120 at block 550, the KMF 160 determines whether a touchless key provisioning operation is enabled at the KMF 160 for the communication device 120 to operate with a particular security level indicated in the mapping information included in the response received from the communication device 120. If the KMF 160 determines that a touchless key provisioning operation is not enabled at the KMF 160 to operate the communication device 120 with a particular security level indicated in the mapping information included in the response received from the communication device 120, the KMF 160 refrains from provisioning the communication device 120 with the KEK. In other words, the KMF 160 does not execute the functions described herein with reference to block 550. On the other hand, when the touchless key provisioning operation is enabled at the KMF 160 to operate the communication device 120 with a particular security level indicated in the mapping information included in the response received from the communication device 120, the KMF 160 proceeds to execute the touchless provisioning operation for the communication device 120 as shown in block 550.

At block 550, the communication device 120 is provisioned with the KEK. In accordance with some embodiments, the KMF 160 provisions the communication device 120 with the KEK by deriving a symmetric touchless key provisioning (TKP) key based at least in part on the public key (i.e., public key imported at block 520) of the communication device. The KMF 160 encrypts the KEK assigned at block 530 with the symmetric TKP key to generate a key wrapped key encryption key or key wrapped KEK. The KMF 160 then transmits a key management message including the key wrapped KEK to the communication device 120 for decryption by the communication device 120. The KMF 160 may receive a response from the communication device 120 when the communication device 120 successfully decrypts the KEK from the key wrapped KEK and provisions the KEK. In this case, after determining that the KEK is successfully provisioned at the communication device 120, the KMF 160 may further disable the touchless key provisioning operation for the communication device 120 to operate in the particular security level indicated in the mapping information included in the response received from the communication device 120. Disabling the touchless key provisioning operation for the particular security level ensures that the KMF 160 does not send additional KEKs for the same security level through a touchless key provisioning operation. In other words, the KMF 160 performs a single touchless key provisioning operation for each security level associated with the communication device 120.

In accordance with some embodiments, prior to provisioning the KEK at the communication device 120, the KMF 160 determines whether the communication device 120 is an authenticated communication device. In other words, the KMF 160 checks whether the KMF has previously imported a public key of the communication device 120 from the device management server 150. In these embodiments, the KMF 160 transmits a key management message (KMM) to the communication device 120 to request the communication device 120 to provide a public key identifier uniquely identifying a public key stored at the communication device 120. The communication device 120 transmits a response including a public key identifier identifying a public key stored at the communication device 120. If the communication device 120 is configured with multiple asymmetric key pairs, then the communication device 120 transmits a public key identifier that is mapped to a security level with which the communication device 120 will be operated. For example, if the communication device 120 is to be operated (e.g., after powering-up for operation at a customer site) with FIPS 140-2 level 3 security level, then the communication device 120 transmits a public key identifier that is mapped to the FIPS 140-2 level 3 security level to the KMF 160. When the KMF 160 receives a response including the public key identifier from the communication device 120, the KMF 160 compares the public key identifier received from the communication device 120 with one or more public key identifiers respectively identifying the public keys of the communication device 120 previously imported from the device management server 150. When the public key identifier received from the communication device 120 matches with any of the public key identifiers of the public keys imported from the device management server 150, the KMF 160 determines that the communication device 120 is an authenticated communication device and thereafter initiates execution of a provisioning process to securely provision the communication device 120 with the KEK. On the other hand, if the public identifier received from the communication device 120 does not match with any of the public key identifiers of the public keys from the device management server 150, the KMF 160 determines that the communication device 120 is not an authenticated communication device and further refrains from executing the provisioning process to provision the KEK for the communication device 120.

To execute the provisioning process at block 550, the KMF 160 generates a key management message (KMM) by applying an encryption scheme to the public key of the communication device 120. The key management message comprises the symmetric touchless key provisioning key that is derived based at least in part using the public key of the communication device 120. The KMF 160 may use an elliptic curve integrated encryption scheme (ECIES) or a modified version of ECIES to encrypt the KEK for delivery to the communication device 120. As a non-limiting example, one or more of the following algorithmic components may be selected as part of the provisioning operation: (a) a key agreement scheme (e.g., Elliptic-curve Diffie-Hellman (ECDH)); (b) a key derivation function with digest algorithm (e.g., concatenation key derivation function (KDF) with SHA384 digest); (c) a message authentication code (MAC) function and digest (e.g., APCO MAC—AES256-CBC with MAC key derivation from AES key wrap or HMAC SHA384); and (d) a crypto function and security mode (AES256-CBC, AES-GCM, or AES256 key wrap). In one embodiment, the KMF 160 generates an ephemeral key pair including an ephemeral private key and an ephemeral public key. The KMF 160 further generates a shared secret using the public key of the communication device 120 and the ephemeral private key. The KMF 160 then applies a key derivation function to the shared secret to create the symmetric touchless key provisioning key. The KMF 160 encrypts the KEK using the symmetric touchless key provisioning key to generate a key wrapped KEK. The KMF 160 then generates a key management message including the ephemeral public key and the key wrapped KEK for transmission to the communication device 120.

In accordance with embodiments, the communication device 120 receives the key management message from the KMF 160. The communication device 120 then decrypts the KEK from the key wrapped KEK. The touchless key provisioning operation is completed for the communication device 120 when the communication device 120 is provisioned by storing the KEK within the memory 230 of the communication device. The communication device 120 then performs normal OTAR operation with the KMF 160 to obtain one or more traffic encryption keys (TEKs) using the decrypted KEK.

In accordance with some embodiments, the communication device 120 determines whether the KMF 160 sending the key wrapped key encryption key is an authenticated KMF. In order to determine whether the KMF 160 sending the key wrapped key encryption key is an authenticated KMF 160, the communication device 120 verifies whether the KMF 160 is in possession of a valid public key that was generated by the communication device 120 during its factory provisioning and configuration. In accordance with embodiments, when the communication device 120 receives the key management message including the key wrapped key encryption key and the ephemeral public key from KMF 160, the communication device 120 independently generates a shared secret key using the ephemeral public key and the private key corresponding to the public key in the communication device's 120 asymmetric key pair. The communication device 120 further applies a key derivation function to the shared secret to independently create a symmetric TKP. The communication device 120 then verifies that the KMF 160 is in possession of the public key of the communication device by validating the key wrapped KEK using the symmetric TKP key derived at the communication device 120. Validating the key wrapped KEK includes successfully decrypting the KEK using the symmetric TKP key. In other words, decryption of KEK from the symmetric TKP keys fails if the KMF 160 does not hold a public key of the communication device 120 and therefore does not use a public key of the communication device 120 to derive the symmetric TKP key used for wrapping the KEK. By validating the key wrapped KEK received from the KMF 160, the communication device 120 determines that the KMF 160 sending the key management message including the key wrapped KEK is an authenticated KMF and therefore can be trusted. In another embodiment, the communication device 120 authenticates the KMF 160 using a certificate assigned to the KMF 160. In this embodiment, the certificate is assigned to the KMF 160 and further uploaded to the device management server 150. The device management server 150 then distributes the certificate to the communication device 120.

In any case, when the communication device 120 authenticates the KMF 160 and decrypts the KEK from the key management message received from the KMF 160, the communication device 120 stores the KEK within the memory 230 of the communication device 120. The communication device 120 then transmits a message to the KMF 160 indicating a successful decryption and provisioning of the KEK at the communication device 120. At this point, the touchless key provisioning operation is successfully completed for the communication device 120 to operate the communication device 120 with a particular security level indicated in the mapping information included in the response sent from the communication device 120 to KMF 160. In accordance with some embodiments, if the communication device 120 operates in a security level that does not support a particular algorithm, then the touchless key provisioning operation for the particular algorithm will fail at the communication device 120 as the communication device 120 will not be able to successfully decrypt the KEK for a particular algorithm. For instance, if the communication device 120 is operating in FIPS 140-2 level 3 security level and the KMF 160 performs a touchless key provisioning operation for the communication device 120 to transfer a KEK compliant with the DES algorithm, then the communication device 120 will not be able to decrypt the KEK because the DES algorithm is not supported by the FIPS 140-2 level 3 security level. The communication device 120 operating in FIPS 140-2 level 3 security level will be able to decrypt KEKs that are compliant with the algorithms (e.g., AES algorithm) supported by the FIPS 140-2 level 3 security level. In accordance with embodiments, after successfully completing the touchless key provisioning operation, the communication device 120 can perform further OTAR operations with the same KMF 160 to obtain traffic encryption keys from the KMF 160 using the KEK received through the touchless key provisioning operation. The communication device 120 can then use the traffic encryption keys for encrypting voice and/or data transmissions.

In the embodiment where the KMF 160 assigns one or more TEKs in addition to or alternative to KEKs at block 530, the KMF 160 may directly provision the communication device 120 with the TEK at block 550. In this embodiment, the KMF 160 provisions the communication device 120 with one or more TEKs (in addition to or alternative to provisioning the communication device 120 with the KEK) by similarly deriving a symmetric touchless key provisioning (TKP) key based at least in part on the public key (i.e., public key imported at block 520) of the communication device. The KMF 160 encrypts the TEK assigned at block 530 with the symmetric TKP key to generate a key wrapped traffic encryption key or key wrapped TEK. The KMF 160 then transmits a key management message including the key wrapped TEK to the communication device 120 for decryption by the communication device 120. The KMF 160 may receive a response from the communication device 120 when the communication device 120 successfully decrypts the TEK from the key wrapped TEK and provisions the TEK.

In an alternative embodiment, to execute the provisioning process at block 550, the KMF 160 does not generate a TKP key and instead encrypts the KEK assigned to the communication device 120 with the public key of the communication device 120 using an asymmetric algorithm (e.g., RSA algorithm). The KMF 160 then sends a key management message to the communication device 120. The key management message comprises an encrypted KEK that is generated based on encrypting the KEK with the public key of the communication device 120. The encrypted KEK can be decrypted only using a private key that was generated corresponding to the public key used to encrypt the KEK. The communication device 120 then receives the key management message including the encrypted KEK. The communication device 120 can successfully decrypt the encrypted KEK using the private key as long as the KMF 160 used the public key associated with the corresponding asymmetric key pair to encrypt the KEK. The communication device 120 then performs normal OTAR operation with the KMF 160 to obtain one or more TEKs using the KEK. The communication device 120 can then use the traffic encryption keys for encrypting voice and/or data transmissions.

In another alternative embodiment where the KMF 160 assigns (in addition to or alternative to KEK), at block 530, a TEK to the communication device 120, the KMF 160 encrypts the TEK with the public key of the communication device. The encrypted TEK is included (in addition to or alternative to encrypted TEK) in the key management message transmitted to the communication device 120. The communication device 120 can then successfully decrypt the encrypted TEK using the private key as long as the KMF 160 used the public key associated with the corresponding asymmetric key pair to encrypt the TEK.

In accordance with some embodiments, the communication device 120 and KMF 160 similarly repeat the functions described with reference to blocks 530 through 550 for provisioning KEKs required for operating the communication device 120 with other security levels. For example, if there are three algorithms (e.g., AES, DES-OFB, DVP-XL) that are available for the communication device 120 to perform OTAR operation, then the KMF 160 repeats the TKP key derivation process three times to derive three TKP keys that each uniquely wrap the three KEK's corresponding to the three algorithms. In accordance with some embodiments, a single target communication device 120 could obtain keys from multiple KMFs by repeating the process 500 with each KMF. For example, when the communication device 120 is to be associated with a new KMF personality, for example, when the communication device roams to another geographic area, the communication device 120 and the new KMF repeat the functions described with reference to blocks 520 through 550 to provision one or more KEKs for the communication device 120. The new KMF can similarly perform the touchless key provisioning operation for the communication device 120 after importing the public key(s) generated by the communication device 120 during its factory provisioning and configuration.

Embodiments described herein can be advantageously implemented to deliver end to end encryption keys to target devices such as land mobile radios that operate on low bandwidth networks for group communication. Embodiments described herein eliminate the need to manage a public key infrastructure to deliver certificates or to deliver or manually enter an initial symmetric key into the radio. In the embodiments described herein, public keys are delivered to an infrastructure key manager (KMF) by way of factory and configuration process rather than included within certificates. This eliminates the need to send full certificates over a low bandwidth land mobile radio link.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for performing a touchless key provisioning operation for a communication device, the method comprising:
   importing, at a key management facility (KMF), a public key and a public key identifier uniquely identifying the public key of the communication device, the public key associated with an asymmetric key pair generated at the communication device during factory provisioning and configuration of the communication device;
   registering, at the KMF, the communication device;
   assigning, at the KMF, a key encryption key (KEK) for the communication device; and
   provisioning, at the KMF, the communication device with the KEK by:
      deriving a symmetric touchless key provisioning (TKP) key based at least in part on the public key of the communication device;
      encrypting the KEK with the symmetric TKP key to generate a key wrapped KEK; and
      transmitting the key wrapped KEK to the communication device for decryption by the communication device.

2. The method of claim 1, wherein deriving comprises:
   generating, at the KMF, an ephemeral key pair including an ephemeral private key and an ephemeral public key;
   generating, at the KMF, a shared secret using the public key of the communication device and the ephemeral private key; and
   applying, at the KMF, a key derivation function to the shared secret to create the symmetric TKP key.

3. The method of claim 2, wherein transmitting comprises:
   generating, at the KMF, a first key management message including the ephemeral public key and the key wrapped KEK; and
   transmitting, at the KMF, the first key management message to the communication device.

4. The method of claim 1, further comprising:
   determining that the communication device is an authenticated communication device prior to provisioning the communication device with the KEK.

5. The method of claim 4, wherein determining comprises:
   transmitting, at the KMF, a second key management message to the communication device to request the communication device to provide a public key identifier uniquely identifying a public key stored at the communication device;
   receiving, at the KMF, a response to the second key management message from the communication device, the response including a second public key identifier identifying a public key stored at the communication device; and
   determining that the communication device is an authenticated communication device when the second public key identifier matches with the public key identifier uniquely identifying the public key imported at the KMF.

6. The method of claim 5, wherein the response includes mapping information mapping the second public key identifier to a particular security level with which the communication device is to be operated, wherein the particular security level is selected from a plurality of security levels.

7. The method of claim 6, further comprising:
   determining, at the KMF, prior to provisioning the communication device with the KEK, whether a touchless key provisioning operation is enabled at the KMF for the communication device to operate with the particular security level; and
   refraining, at the KMF, from provisioning the communication device with the KEK when the touchless key provisioning operation is not enabled at the KMF for the communication device to operate with the particular security level.

8. The method of claim 6, further comprising:
   determining, at the KMF, prior to provisioning the communication device with the KEK, that a touchless key provisioning operation is enabled at the KMF for the communication device to operate with the particular security level; and
   disabling, at the KMF, the touchless key provisioning operation for the communication device to operate with the particular security level after provisioning the communication device with the KEK.

9. The method of claim 6, further comprising:
   determining, at the KMF, prior to provisioning the communication device with the KEK, that the public key identifier matching the second public key identifier is mapped to the particular security level; and
   using, at the KMF, the public key identified by the public key identifier for deriving the symmetric TKP key.

10. The method of claim 6, further comprising:
    importing, at the KMF, at least one other public key and at least one other public key identifier uniquely identifying the at least one other public key, the at least one other public key associated with at least one other asymmetric key pair generated at the communication device during factory provisioning and configuration of the communication device.

11. The method of claim 10, further comprising:
    determining, at the KMF, prior to provisioning, that the at least one other public key identifier is not mapped to the particular security level; and
    refraining from using the at least one other public key identified by the at least one other public key identifier for deriving the symmetric TKP key.

12. The method of claim 1, wherein importing comprises:
    extracting the public key of the communication device from the communication device for storage at a factory database prior to the communication device being shipped out of a factory;
    transmitting the public key of the communication device from the factory database to a device management server in response to a customer order for the communication device; and
    importing the public key of the communication device at the KMF from the device management server.

13. A method for performing a touchless key provisioning operation for a communication device, the method comprising:
    storing, at the communication device, an asymmetric key pair including a private key and a public key, the asymmetric key pair generated at the communication device during a factory provisioning and configuration of the communication device;
    registering the communication device with a key management facility (KMF);
    receiving, at the communication device, a key management message including a key wrapped key encryption key (KEK) from the KMF, wherein the key wrapped KEK is generated by encrypting a KEK assigned for the communication device with a symmetric touchless key provisioning (TKP) key and wherein the symmetric TKP key is derived based at least in part on the public key of the communication device; and decrypting the KEK from the key wrapped KEK and storing the KEK at the communication device.

14. The method of claim 13, further comprising:
determining, at the communication device, that the KMF is an authenticated KMF.

15. The method of claim 14, where determining comprises:

generating, at the communication device, a shared secret using an ephemeral public key included in the key management message received from the KMF and the private key of the asymmetric key pair;

applying, at the communication device, a key derivation function to the shared secret to create the symmetric TKP key; and verifying, at the communication device, that the KMF is in possession of the public key of the communication device by validating the key wrapped KEK using the symmetric TKP key.

16. The method of claim 14, further comprising:
receiving, at the communication device, a first key management message from the communication device to request the communication device to provide a public key identifier uniquely identifying a public key stored at the communication device; and transmitting, at the communication device, a response to the first key management message from the communication device, the response including a public key identifier identifying the public key stored at the communication device and mapping information mapping the public key identifier to a particular security level with which the communication device is to be operated, wherein the particular security level is selected from a plurality of security levels.

17. A system comprising:
a communication device configured to establish an asymmetric key pair including a private key and a public key for the communication device during a factory provisioning and configuration of the communication device; and a key management facility (KMF) configured to:
import the public key and a public key identifier uniquely identifying the public key of the communication device;
register the communication device;
assign a key encryption key (KEK) for the communication device;
and
provision the communication device with the KEK by deriving a symmetric touchless key provisioning (TKP) key based at least in part on the public key of the communication device, encrypting the KEK with the symmetric TKP key to generate a key wrapped KEK, and transmitting the key wrapped KEK to the communication device for decryption by the communication device.

18. The system of claim 17, further comprising:
a factory server configured to request the communication device to establish the asymmetric key pair and to extract the public key stored at the communication device for storage at a factory database; and a device management server configured to provision information identifying the KMF at the communication device and to further obtain the public key of the communication device from the factory database, wherein the KMF imports the public key of the communication device from the device management server.

* * * * *